United States Patent
Reagan

(10) Patent No.: US 11,968,320 B2
(45) Date of Patent: Apr. 23, 2024

(54) SYSTEMS AND METHODS FOR INFORMATION GATHERING, MANAGING AND DISSEMINATING FOR ASSESSMENTS AND NOTIFICATIONS IN LAW ENFORCEMENT AND OTHER ENVIRONMENTS

(71) Applicant: Lisa Reagan, Windham, ME (US)

(72) Inventor: Lisa Reagan, Windham, ME (US)

( * ) Notice: Subject to any disclaimer, the term of this patent is extended or adjusted under 35 U.S.C. 154(b) by 0 days.

(21) Appl. No.: 17/550,784

(22) Filed: Dec. 14, 2021

(65) Prior Publication Data

US 2022/0109751 A1    Apr. 7, 2022

Related U.S. Application Data

(63) Continuation-in-part of application No. 15/929,862, filed on May 26, 2020.

(60) Provisional application No. 62/853,506, filed on May 28, 2019.

(51) Int. Cl.
| | |
|---|---|
| H04M 1/72421 | (2021.01) |
| G06F 16/9535 | (2019.01) |
| G06F 21/31 | (2013.01) |
| G06Q 50/26 | (2012.01) |
| H04M 1/72436 | (2021.01) |

(52) U.S. Cl.
CPC .... *H04M 1/72421* (2021.01); *G06F 16/9535* (2019.01); *G06F 21/31* (2013.01); *G06Q 50/265* (2013.01); *H04M 1/72436* (2021.01); *H04M 2250/58* (2013.01)

(58) Field of Classification Search
CPC ................... H04M 1/72421; H04M 1/72436
See application file for complete search history.

(56) References Cited

U.S. PATENT DOCUMENTS

| | | | |
|---|---|---|---|
| 2015/0065077 A1* | 3/2015 | Kim | H04W 4/90 455/404.1 |
| 2015/0222746 A1* | 8/2015 | Bennett | H04M 3/2281 455/411 |
| 2016/0373910 A1* | 12/2016 | Moss | G06F 9/453 |
| 2017/0013113 A1* | 1/2017 | Bendi | H04M 3/42102 |
| 2019/0020905 A1* | 1/2019 | Bennett | H04N 5/917 |

\* cited by examiner

*Primary Examiner* — Amal S Zenati
(74) *Attorney, Agent, or Firm* — Caseiro Burke LLC; Chris A. Caseiro; Nicholas A. McCrillis

(57) ABSTRACT

Systems and related methods arranged to improve public safety agency access to phone-based information and communications with citizens. A first system enables a user to gather, store, access and share phone information associated with public safety agency activities including by retaining phone information and "in the hand" user information. A second system enables a public safety agency to exchange of information with one or more citizens, and a related system controls text-based exchanges with citizens to limit their access to agency representatives.

5 Claims, 22 Drawing Sheets

| Display Name | First | Last | Organization | Middle | phones | emails | Note | Kind | Job Title | Prefix | Suffix | Nick Name | Creation Date | Modification Date |
|---|---|---|---|---|---|---|---|---|---|---|---|---|---|---|
| Any Name | First Name | Last Name | Work Place | | Mobile: (207) 561- | | | 0 | | | | | 2015-03-04 15:48:47 +0000 | 2015-03-04 15:49:25 +0000 |
| Any Name | First Name | Last Name | Work Place | | | | | 0 | waitress/ Hostess | | | | 2014-12-28 10:18:39 +0000 | 2015-03-31 18:34:43 +0000 |
| Any Name | First Name | Last Name | Work Place | | Mobile: (207) 299-2 | | | 0 | | | | | 2014-08-14 07:51:35 +0000 | 2014-18-14 07:52:04 +0000 |
| Any Name | First Name | Last Name | Work Place | | | | | 0 | Experiemced worker | | | | 2015-02-01 20:56:51 +0000 | 2015-03-27 16:05:55 +0000 |

The Back End
Who's data, what data, and how?

1. LEA DATA ONLY IN THE BACK END
2. LEA EXPORTS SPECIFIC DATA EVERY EVENING AND IT IS SAVED IN A FOLDER AND ON THE NETWORK.
3. PHONE-IN-HAND CHECKS THE DATA FOR ERRORS AND RE-WRITES THE FILE WITH THE ERRORS FIXED.
4. THE NEW WRITTEN FILE IS IMPORTED INTO THE PHONE-IN-HAND DATABASE AFTER THE FILE IS WRITTEN AND ADDS THE NEW DATA TO PHONE-IN-HAND.
5. LEA'S WOULD PROVIDE THE FOLLOWING DATA:

CAD DATA FILE 1
1. AGENCY NAME
2. CAD CALL NUMBER
3. CASE NUMBER
4. CALLER'S LAST NAME
5. CALLER'S FIRST NAME
6. CALLER'S DOB
7. CALLER'S PHONE NUMBER
8. DATE OF CALL
9. TIME OF CALL
10. CALL FOR SERVICE TYPE
11. CAD SOURCE (CAD CALLER)
12. BUSINESS NAME
13. NAMES OF OTHERS IN THE CALL

CRIME DATA FILE 2
1. AGENCY NAME
2. CAD CALL NUMBER
3. CASE NUMBER
4. LAST NAME
5. FIRST NAME
6. DOB
7. PHONE NUMBER
8. DATE OF CALL
9. TIME OF CALL
10. CRIME TYPE
11. CRIME SOURCE (VICTIM,WITNESS)
12. BUSINESS NAME
13. OTHER NAMES IN THE CASE

Intelli Bucket
Investigative / VOIP
Date / Intelligence

Unique Identifier
1. LAST NAME
2. FIRST NAME
3. PHONE NUMBER
4. ORGANIZATION AFFILIATION (SEX OFFENDER, GANG NAME)
5. NICKNAME
6. DOB
7. SOURCE OF INFORMATION

*Important to have aside from cloud based or Cad Or RMS Data = CFR Compliant*

*These files may relate. Some calls for service turn into crimes but not all crimes were call for service.*

LEA=Law Enforcement Agency (Military or Court System or 3rd Party Contractor Operating on behalf of Government Entity Included)

FIG. 3

The Back End Continued
Who's data, what data, and how?

The user can also add phone numbers through the interface. They will have two options.

1. To add data via a batch upload and or one phone number at a time. The batch upload must be a drag and drop or file upload. The software must read any excel, text tab delimited, or comma separated file and then open it up for the user to view it. At this point, the software should ask the user to select columns and map each column to a file in the database.

2. The user can add one number at a time and type in the numbers and all the other fields too.

3. Upload .jpg or .png data from these files into the software.

1A. If the user is using the batch upload feature, the software will open the file in a viewing form and allow the user to highlight the column and select that column as a data type to be mapped into the application. NOTE: some of these phone number data will need to be removed of all characters such as :- or (or) or extra space and such. The fields they will want to batch import into Phone-in-Hand will be: Display name, Last Name, First Name, Business, Phone Number, Email (if there is more than one then the software needs to be smart enough to separate the two via finding the ";" that is between the two email addresses, Address, and IMS, Phone Book Owner (free text by user), case number / source, and Lead On Case Name.

FIG. 4

The Back End Continued
Who's data, what data, and how?

2A. The user can hand type the phone number into the fields prompted by Phone-in-Hand that are outlined under 1A. Make a flagging for attempting to identify the phone number. When the new data is uploaded every night, have these attempt to ID's cross reference with the new data and save the results in the storage. If there are results in storage, please alert on first screen.

3A. If the user receives a .jpg or a .png from a field agent, the user should be able to upload (via a drag and drop or the browse upload feature), and the software will read the image and transcribe the image into data. The user will then be allowed to add any defining data (outlined in 1A or 2A) and also Phone-in-hand will then allow the user to identify the data on the image and import it into Phone-in-Hand. In the future,

FIG. 5

|   | A | B | C | D | E | F | G | H |
|---|---|---|---|---|---|---|---|---|
| 12 | Anthony D | 3.21E+09 | | | | | | |
| 13 | Ben | 2.07E+09 | | | | | | |
| 14 | BowdenM | 2831441 | | | | | | |
| 15 | Brandon | 2.08E+09 | | | | | | |
| 16 | Bread | 2.08E+09 | | | | | | |
| 17 | Briana | 2.07E+09 | | | | | | |
| 18 | CapitalOn | 8.01E+09 | | | | | | |
| 19 | Catyln | 6.18E+09 | | | | | | |
| 20 | Chef | 2.07E+09 | | | | | | |
| 21 | Cheff | 2.08E+09 | | | | | | |
| 22 | Chelsea | 2.07E+09 | | | | | | |
| 23 | Claire | 2.08E+09 | | | | | | |
| 24 | ClaireBoy | 2.08E+09 | | | | | | |
| 25 | ClareDevi | 2.08E+09 | | | | | | |
| 26 | Courtny | 2.08E+09 | | | | | | |
| 27 | CourtnyW | 2.08E+09 | | | | | | |
| 28 | Dad | 2.07E+09 | | | | | | |

Select destination and press ENTER or choose Paste

FIG. 6B

Conducting A Ping or A Search

Phone-in-Hand will search all of the phone numbers in the "to be searched bucket"

RESULTS BUCKET

| PHONES NUMBER IN SEARCH BUCKET | DISPLAY NAME IN SEARCH BUCKET | APPEARS IN | CFS # | CASE# | CAD SOURCE | CRIMES SOURCE | UNIQUE IDENTIFIER |
|---|---|---|---|---|---|---|---|
| 2075627541 | PIPER SMITH | CAPE ELIZABETH PD (AGENCY NAME) | 102 46 | 789 456 3 | WITNESS | COMPLAINTANT | SEX OFFENDER |

CLICK TO SEARCH

Results are:
1 Bucket Search Name
2. Phone number
3. Results Bucket Display Name
4. Unique identifier
5. Source.
7. Nickname

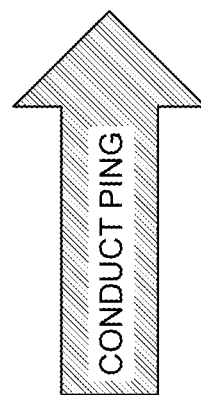

CONDUCT PING

FIG. 7

ONCE IN THE BUCKET THE USER SELECTS THE COLUMN AND MAPS IT TO THE DATABASE

| | A | B | C | D | E |
|---|---|---|---|---|---|
| 1 | Display Na | First | Last | Organiza | Middle |
| 2 | <empty> | | | | |
| 3 | <empty> | | | | |
| 4 | <empty> | | | | |
| 5 | ANY NAME | FIRST | LAST N | WORK PLACE | |
| 6 | ANY NAME | FIRST | LAST N | WORK | Jacob |
| 7 | ANY NAME | FIRST | LAST NAME | | |
| 8 | ANY NAME | FIRST | LAST N | WORK PLACE | |
| 9 | ANY NAME | FIRST | LAST N | | |
| 10 | ANY NAME | FIRST | LAST N | WORK PLACE | |
| 11 | ANY NAME | FIRST | LAST N | | |
| 12 | ANY NAME | FIRST | LAST N | | |
| 13 | ANY NAME | FIRST | LAST N | WORK PLACE | |
| 14 | ANY NAME | FIRST | LAST N | WORK PLACE | |
| 15 | ANY NAME | FIRST | LAST N | WORK PLACE | |
| 16 | ANY NAME | FIRST | LAST N | The Man | |
| 17 | ANY NAME | FIRST | LAST N | WORK PLACE | |
| 18 | ANY NAME | FIRST | LAST N | | |
| 19 | ANY NAME | FIRST | LAST N | WORK PLACE | |

DRAG AND DROP FILE INTO THE BUCKET OR BROWSE AND SELECT FILE HERE

THIS PROCESS REPEATS FOR JPG OR PNG ENTRIES. FOR SINGLE UPLOADS A FORM WOULD WORK.

FIG. 8A

THE USER CAN DRAG AND DROP ANY FILE INTO THIS BUCKET OR BROWSE AND SELECT
THE DATA WILL OPEN INSIDE OF THE BUCKET

| Display Name | First Name | Last Name | Organization | Middle Name | Work Place | phones | emails | Note | Kind | Job Title | Pre-fix | Suf-fix | Nick Name | Creation Date | Modification Date |
|---|---|---|---|---|---|---|---|---|---|---|---|---|---|---|---|
| <empty> | | | | | | Other: 838-604 | | | 0 | | | | | 2014-08-04 01:14:19 +0000 | 2014-08-04 01:14:39 +0000 |
| <empty> | | | | | | Mobile: (774) 274- | | | 0 | | | | | 2014-10-09 03:55:23 +0000 | 2014-08-04 03:55:27 +0000 |
| <empty> | | | | | | Mobile:1A (207)A 69 | | | 0 | | | | | 2014-09-13 01:47:36 +0000 | 2014-09-13 01:47:47 +0000 |
| Any Name | First Name | Last Name | | | Work Place | | Other:aaron.ecker@cketmail.com; Other:aecker77@facebook.com Other:abbybillington0@gmail.com | | 0 | | | | | 2014-12-28 10:18:38 +0000 | 2015-04-01 21:45:21 +0000 |
| Any Name | First Name | Last Name | | Jacob | Work Place | | | | 0 | Service Technician | | | | 2014-12-28 10:18:46 +0000 | 2015-04-02 00:12:35 +0000 |

DRAG AND DROP FILE INTO THE BUCKET
OR BROWSE AND SELECT FILE HERE

| Display Name | First Name | Last Name | Organi-zation Name | Middle Name | phones | emails | Note | Kind | Job Title | Pre-fix | Suf-fix | Nick Name | Creation Date | Modification Date |
|---|---|---|---|---|---|---|---|---|---|---|---|---|---|---|
| Any Name | First Name | Last Name | | | | | | 0 | | | | | 2014-12-28 10:18:39 +0000 | 2015-03-31 18:34:43 +0000 |
| Any Name | First Name | Last Name | Work Place | | | | | 0 | Busser | | | | 2014-12-28 10:18:38 +0000 | 2015-03-30 13:37:53 +0000 |
| Any Name | First Name | Last Name | | | Mobile:1 (207) 332 | Other:acflint @student. umass.edu; Other:alice. flint.965@fa cebook.com | | 0 | | | | | 2014-12-12 20:56:35 +0000 | 2014-12-12 20:56:40 +0000 |
| Any Name | First Name | Last Name | Work Place | | | | | 0 | Ice cream Scooper | | | | 2014-12-28 10:18:40 +0000 | 2015-04-01 21:45:21 +0000 |
| Any Name | First Name | Last Name | Work Place | | Mobile: (207) 400-4 | | | 0 | | | | | 2014-08-30 14:21:45 +0000 | 2014-08-30 14:21:57 +0000 |

FIG. 9B

| Display Name | First Name | Last Name | Organi- zation Name | Middle Name | Work Place | phones | emails | Note | Job Kind | Title | Pre- fix | Suf- fix | Nick Name | Creation Date | Modification Date |
|---|---|---|---|---|---|---|---|---|---|---|---|---|---|---|---|
| Any Name | First Name | Last Name | | Middle Name | Work Place | Mobile: (207) 561- | | | 0 | | | | | 2015-03-04 15:48:47 +0000 | 2015-03-04 15:49:25 +0000 |
| Any Name | First Name | Last Name | | Middle Name | Work Place | | | | 0waitress/ Hostess | | | | | 2014-12-28 10:18:39 +0000 | 2015-03-31 18:34:43 +0000 |
| Any Name | First Name | Last Name | | Middle Name | Work Place | Mobile: (207) 299-2 | | | 0 | | | | | 2014-08-14 07:51:35 +0000 | 2014-18-14 07:52:04 +0000 |
| Any Name | First Name | Last Name | | Middle Name | Work Place | | | | 0Experienced worker | | | | | 2015-02-01 20:56:51 +0000 | 2015-03-27 16:05:55 +0000 |

FIG. 9C

Alert

Storage Messages Are Any Attempt To ID's Which Have Been Identified

| | Attempt To ID For: (enter lead detective and case number here) | 207-562-7541 | | Delete x |
|---|---|---|---|---|
| CASE 10-1234 | Found In | Case Number 56789 | Belongs to charlotte Louvat | Reference CAD Call # 158941 On 12/5/2215 Agency: Reagantown PD, MA |

Figure 10 also included in Figure 1

FIG. 10

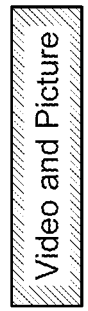

Dispatcher DASHBOARD

Dispatcher or Responder MDT view via secure / Sign-in With User Name & 2FA

Pending CFS Yack-Talk App (header)

CFS#1234, Cad Phone number, Cad Caller Last Name, Cad Caller First Name, Cad Address, Officer Number Dispatched, Call Status (enroute or on scenes) Call start time, Live Recording Alert (blinking red)

SEARCH FEATURES HERE that are stored long term on Cloud:

| CAD CALLER | CFS# | Date Time | Cad Narrative |

Video and Picture   Sample form to include

Cleared Calls:
All of the above information
CAD Narrative Stored By Date and

FIG. 16

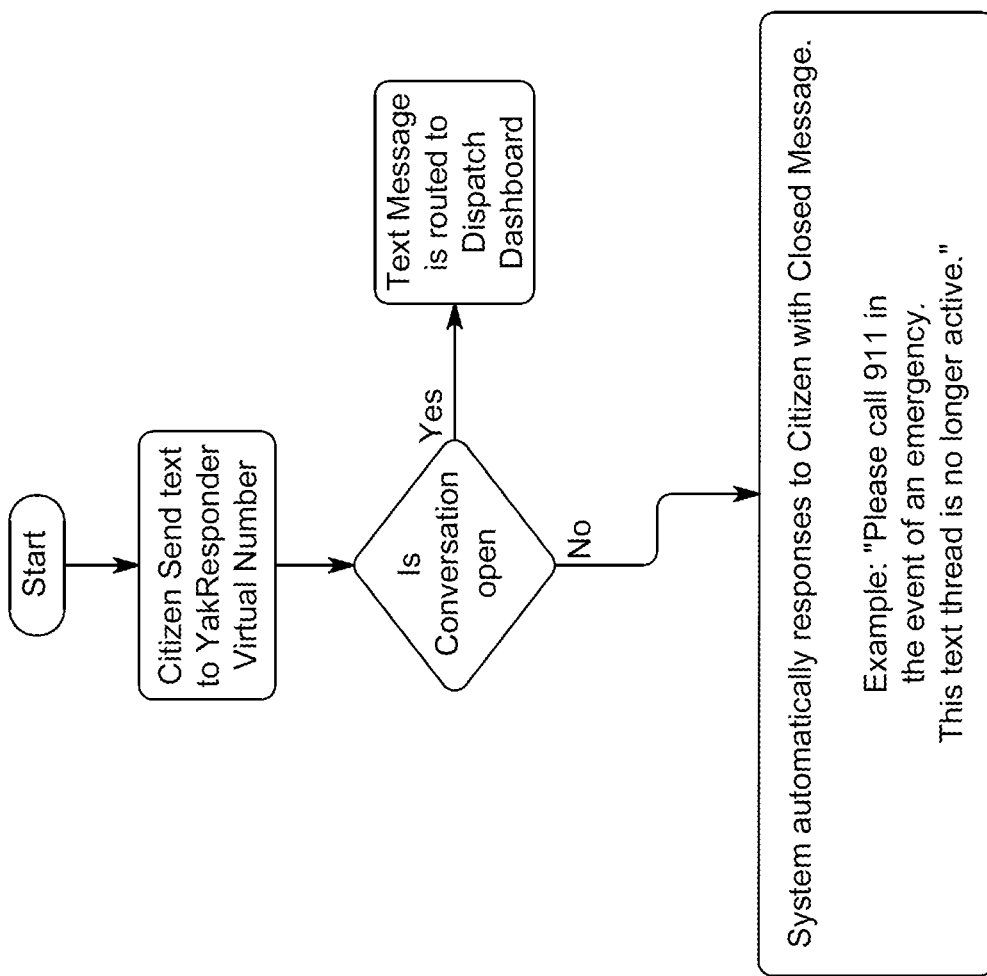

SYSTEMS AND METHODS FOR INFORMATION GATHERING, MANAGING AND DISSEMINATING FOR ASSESSMENTS AND NOTIFICATIONS IN LAW ENFORCEMENT AND OTHER ENVIRONMENTS

BACKGROUND OF THE INVENTION

1. Field of the Invention

The present invention relates to systems and methods that can be used to gather, manage, analyze, and disseminate information. More specifically, the present invention is a software-based system and method implemented on one or more computing devices to enable users to gather, manage, access, and disseminate information of need or interest to law enforcement, which includes, but is not limited to, the court system, parole, and probation, dispatching calls for service, and individuals who interact with law enforcement members. The system further provides a mechanism through which law enforcement can extinguish a communication thread with redirection of a citizen-initiated communication thread to a designated recipient. The present invention can also be implemented in other environments such as, for example, insurance fraud, welfare fraud, court appearance tickets, third-party ambulance services, and third-party transportation services for government and/or military contractors and entities.

2. Description of the Prior Art

Currently, law enforcement organizations and individuals must expend substantial effort, employ substantial resources, and clear substantial legal hurdles to gather and disseminate information relevant to unlawful and potentially unlawful activity. There are good and constitutional reasons for the legal checks placed on law enforcement. However, in those instances where permissible information gathering and dissemination can exist under permitted guidelines, there are other problems that limit law enforcement optimization efforts.

One particular area in which there are mainly logistical hurdles that exist resides in the gathering and identification of information associated with phone usage, including cellular phone usage. Currently, law enforcement can query historical phone number information, which can include phone ownership, phone location and phone usage, in Computer Aided Dispatch ("CAD") and Criminal Records Management Data ("CRIMES") databases. CAD and CRIMES databases are populated with information that is gathered locally, such as through calls for service to local fire and police (CAD information), and that is acquired from resources having such information, such as private phone data agencies (CRIMES information). That is, calls for service result in the gathering of information associated with the call that is entered, managed, and dispatched via the CAD system as well as Criminal or Investigative Records that may be referred to as Records Management Systems ("RMS").

As might be expected, the existing phone information of any particular law enforcement organization may be unique to that organization and may not contain information that can be of importance to an investigation. This is particularly so with the mobility of individuals and the access by users to phone numbers that have no readily apparent connection to the locality. Moreover, the information currently available through database searching about a particular phone provides an incomplete picture of the relevance of that phone to a particular event. Further, the phone information provided by third party services is often erroneous and is of limited value with the usage of burner phones.

To the extent phone information is gathered, particularly cellular phone data, the .csv format of that information is not compatible with the format of CAD and CRIMES data. There exists a need to collect relevant phone information that can be integrated across formats so that silos of data can be minimized. There is also a need to collect relevant phone data that can be shared in a legal manner across jurisdictions so that multiple law enforcement agencies can get the most effective information available in the soonest time possible.

An aspect of public service effectiveness also exists in the dissemination to the public of information of interest, particularly to those members of the public having interaction with those services. This includes, but is not limited to, those individuals who make public service requests and those impacted by such requests. For example, a person calling 911 to report a crime is often interested in learning when law enforcement will arrive at the scene of the event. In addition, neighbors in the surrounding area may be similarly interest in that and other relevant information. Unfortunately, members of the public are often left with uncertainty about the timing as to when assistance is to reach their location. There currently does not exist a mechanism to keep the relevant public informed about critical information. The wide availability of cellular phones makes it possible to provide a broadcast of information of interest but that has heretofore not been enabled. What is needed is a mechanism to disclose information in an effective manner to those having an interest in receiving it.

While it is desirable to enhance recordation, dissemination, and analysis of relevant citizen call-in information, and while it is also desirable to improve communication exchanges with citizens, particularly those who wish to assist law enforcement, it is also important to manage those communications properly. For example, when an officer conducts a text exchange with a party not in law enforcement, that officer exposes his or her communication device, usually a cell phone, to virtually unlimited access by the citizen. That can have negative effect and so what is needed is a mechanism to ensure continued citizen engagement while avoiding exposure of sensitive law enforcement information and also avoiding strain on resources due to excessive citizen contact.

SUMMARY OF THE INVENTION

It is an object of the present invention to legally acquire cell phone information for use in law enforcement and other environments such as, for example, insurance fraud, welfare fraud, court appearance tickets, third-party ambulance services, and third-party transportation services for government and/or military contractors and entities. It is also an object of the present invention to format that information in such a way that it is available across multiple original format types and is also available in form usable across multiple jurisdictions. Further, it is an object of the invention to store the cell phone information in a manner that ensures only those permitted to access it can do so and so that it can be integrated with other types of information of interest to law enforcement and others with a need to know such information for effective analysis.

Another object of the invention is to establish a system that permits law enforcement and other public service providers to keep relevant members of the public informed as to the activities of such providers where they are carrying out their duties and to diversify communication system between 911 Callers and Dispatch Centers by means of modernizing radio communications such as by replacing or at least supplementing the existing radio communication systems with the cellular telephone. Yet another object of the invention is to encourage effective citizen involvement while maintaining control over such exchanges to avoid exposure of sensitive law enforcement information and also avoiding strain on resources due to excessive citizen contact.

These and other objects are achieved with the present invention, which provides a first system and method for cell phone information gathering, formatting, storing, and integration usable by law enforcement, and a second system and method for pushing out to the public information of interest related to public service providers' activities. An aspect of the second system is a mechanism to control access by citizens to law enforcement contact information and cell phone usage.

Both aspects of the invention are established in one or more computer programs that may be implemented on one or more computing devices that include, but are not limited to, mainframe computers, desktop computers, tablets, and mobile devices such as smart phones, for example. The one or more computer programs are arranged to improve the function of the one or more computing devices by making relevant information collection, evaluation, and dissemination more efficient and easier for users to enable. The one or more computer programs may be referred to herein collectively as the computer program or program and the one or more computing devices may be referred to herein collectively as the computing device.

For the phone number gathering and analysis aspect of the invention, a service is provided based on a downloadable or a non-downloadable program accessible over the internet. The program that performs the phone number related functions described herein may be located on one or more dedicated servers, it may be internet cloud based or a combination of the two. The program collects and stores phone data obtained through calls for service and criminal investigations and by other investigative means such as technologies leveraging Voice over IP, Voice over Data, and Voice over Internet technology by first responder departments such as police. This gathering occurs throughout the country, with the option of participant jurisdictions to opt into the system for wider data exchanges. Those parties willing to disclose their own gathered information would have access to similar information gathered by other parties that are also willing to exchange. That phone information organically gathered may be supplemented with that and/or other relevant information available from third party providers. This organic information is gathered as a result of the willingness of individuals to contact first responders and provide personal information, location, conditions and events at the location and the phone number making the contact. The information gathered can be used to identify subjects of interest and interactions between such subjects and participating public safety agencies. That information may be cross checked with information associated with the phone number, such as the owner of that number, if available.

The gathered information is stored in a database that may be queried by authorized personnel. Since the gathered information is not limited to a specific jurisdiction and/or the limited existence of public records information, there is an improved chance that a match between a subject of interest and circumstances surrounding the usage of the phone, including who is actually using the phone, known as "putting the phone in hand" as compared to identifying subscriber information, will occur. This is of particular value when burner phones are used for which no ownership information is available through existing public records forums.

A query may be initiated using a phone number, a person's name, a location, or combinations thereof but not limited to that information. Any "hits" linking an individual to other information, including from a different jurisdiction occurs instantaneously, thereby eliminating the delays and omissions associated with attempts to manually track down information as has been the traditional method of investigation.

The system further optionally provides a distinct and separate database that provides a secure environment for an investigator to store and access phone information that is not to be shared with other jurisdictions including, for example, phone information acquired in a different unrelated case, referred to as phone data extraction methods and investigative technology in addition, numbers appearing in investigations in an undercover capacity where various investigative methods are used to alter the appearance of real cellphone numbers (such as VOIP technology or call spoofing). Locally, the database containing information sharable across jurisdictions and the secured database of information not to be shared across jurisdictions are linked so that users within the jurisdiction can access both forms of information and remain compliant with laws governing data sharing for investigative purposes.

The present invention also provides a cellular phone-based configuration for communicating information from one or more first responders to one or more members of the public. That information dissemination system may be a downloadable or non-downloadable program that may be a software-as-a-service configuration but not limited thereto. It is effectively a customer relationship management tool by which first responder organizations communicate with individuals. The information dissemination system allows an organization to establish an ongoing communication that is initially generated by an individual first contacting the organization, such as through a 911 call, for example. The communication continues through a text exchange wherein the individual is kept informed about time for the organization to have a member on the scene of an event, and for the individual to keep the organization informed about his or her location, or to receive and/or send any other important information.

The system is configured to limit cell phone information conveyed to citizens and the ability of citizens to initiate subsequent text exchanges after receiving officer cell phone text messaging. Specifically, once the ongoing communication has been terminated by the law enforcement professional, the citizen will receive an automated text message informing the citizen that the exchange is no longer active. Instead, should the citizen wish to continue an exchange with law enforcement, the citizen is directed to make a different contact, such as a 911 call, for example but not limited thereto. Further, the data processing component of the system documents the citizen information including phone number and, in the event that citizen attempts to activate a new text string, the prior communication string will be inaccessible, and the citizen is informed that the text thread is no longer active, and they should make the different contact, such as a 911 call, for example.

An advantage of the information dissemination system is that it reduces the load on conventional community contact means, which is primarily by phone calls that tie up dispatchers and can frustrate individuals in need of first responder services during non-emergency calls for service or when the caller cannot speak due to physical limitations, fear, or a language barrier. A further advantage of this system is that it can allay an individual's concerns about first responder action by keeping them regularly informed about progress in getting to a scene, and the dispatcher may compose a message in English but send that message in any language. More specifically, the system may include one or more configurations that enable the dispatcher or any first responder to generate a message in English and then translate that message into a language of choice, one that is compatible with the caller's understanding. The system may also include a corresponding configuration that enables the caller to generate a message in his/her native language and then translate it into English or another selectable language prior to delivery to the dispatcher or other first responder.

The computer applications associated with the program are established in software that embodies functions carried out through the computing device onto which the application is loaded. The software provides the primary functions for the first system described herein of phone information gathering and storage, phone information organization and phone information cross referencing and access. The software provides the primary function of the second system described herein of first responder status information dissemination. The software is generated using application generation tools known to those skilled in the art of producing such programs. For example, the program may be developed by generating computer instructions embodying the functions described using an iOS tool or such other tools as are suitable for generating and modifying a user interface, data gathering and storing, data integration and access, and bug fixing. The advantages of the present invention are enabled by the functionality of the applications described herein, in the accompanying figures, and in the appended claims.

BRIEF DESCRIPTION OF THE DRAWINGS

FIG. 3 is a representation of the type of data stored in the database for the phone information system, showing shared and not shared content forms.

FIG. 4 is a description of the form, content and configuration of phone information loaded into the database for the phone information system.

FIG. 5 is a continuation of the description of the form, content and configuration of phone information loaded into the database for the phone information system.

FIG. 7 is a screen capture of a first specific display of output from the phone information system based on input initiated through the interface of FIG. 6.

FIG. 9 comprises FIGS. 9A, 9B and 9C, which comprise a screen capture set of a third specific display showing the form and/or content of populated database or search results.

FIG. 10 is a screen capture of a fourth specific display showing the alert system content of an automated notification to identify numbers appearing in more than one silo or database. user interface of the information dissemination system of the present invention.

FIG. 16 is a representation of an example dashboard that a dispatcher observes when accessing the chat-client system of the present invention.

FIG. 18 is a flow diagram representing primary steps of the aspect of the system for enabling the opening or closing of a citizen text exchange.

DETAILED DESCRIPTION OF THE INVENTION

Figure 1:
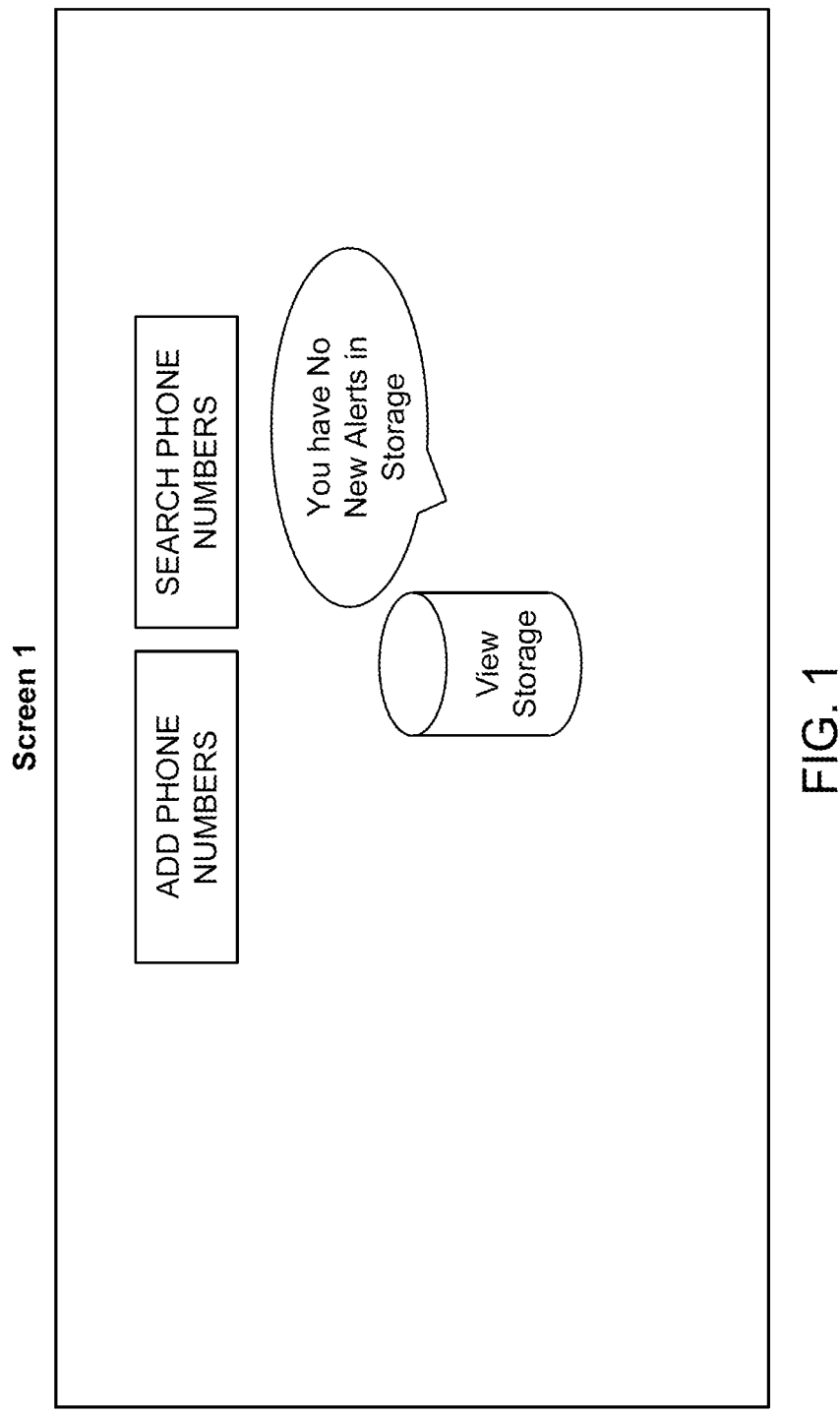
FIG. 1 is a simplified representation of the phone information system of the present invention.
Figure 2:
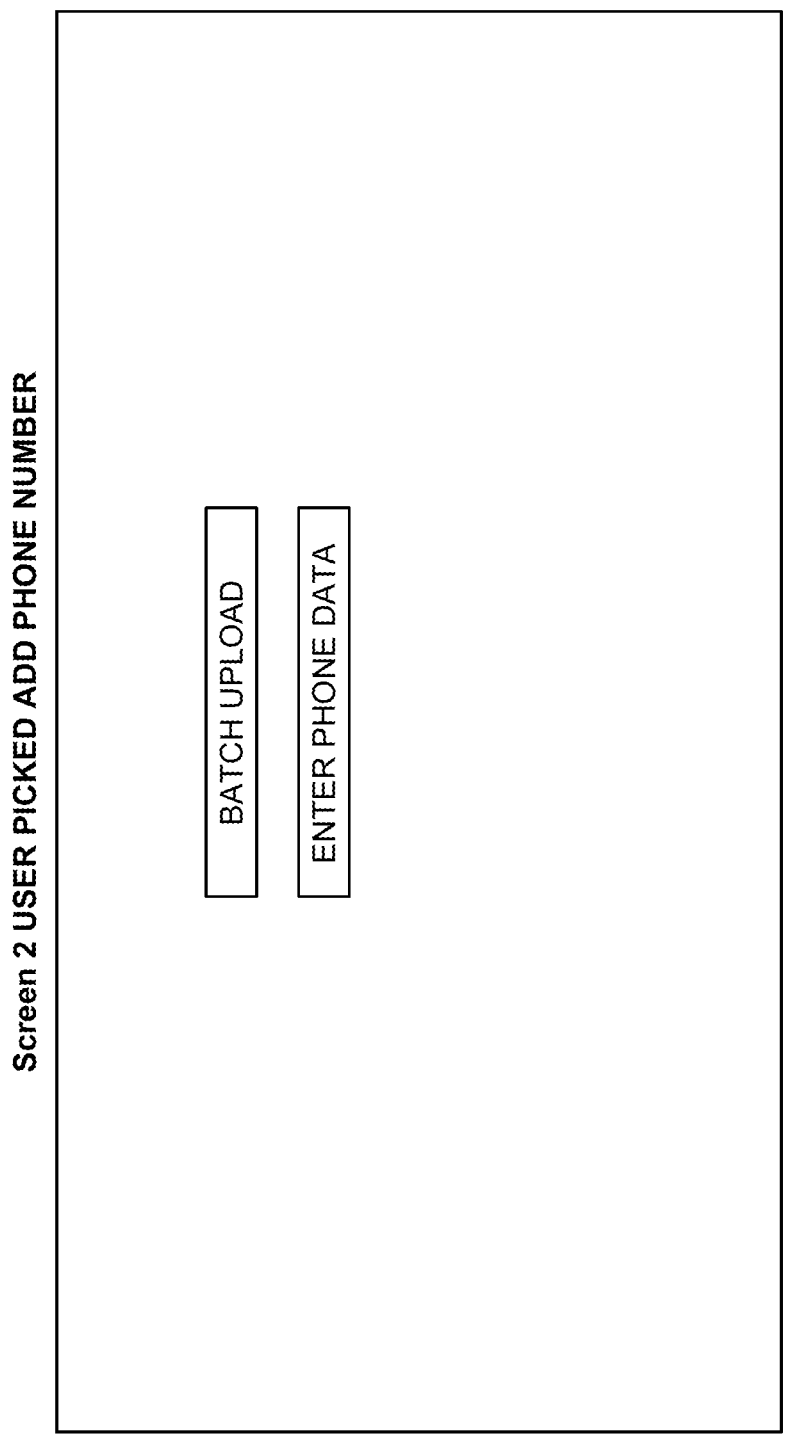
FIG. 2 is a simplified representation of phone information entry stage of the system of the present invention.
Figure 6A:
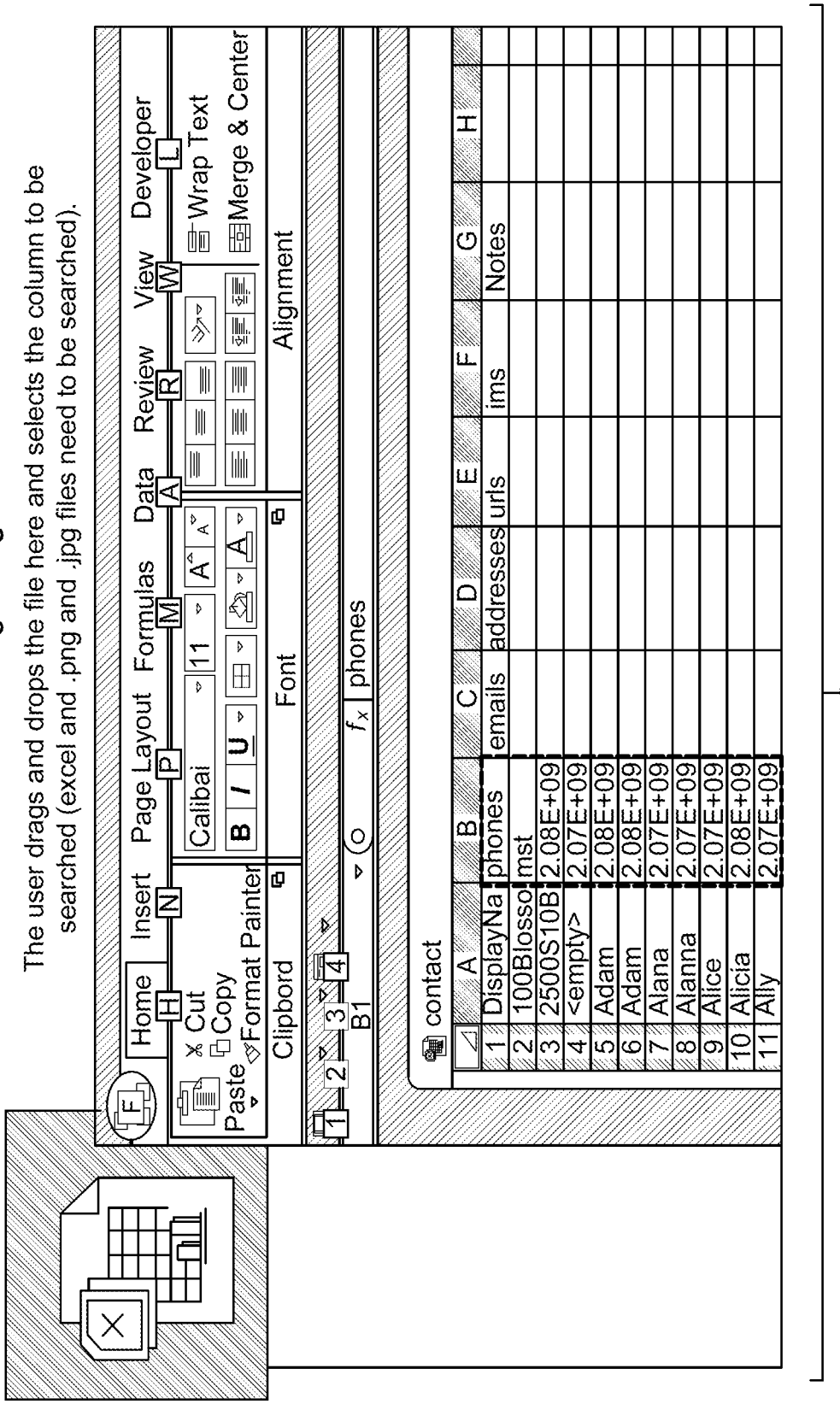
FIG. 6 comprises FIGS. 6A and 6B, which comprise a screen capture set of a user interface display for initiating a search of the phone information storage database.
Figure 8B:
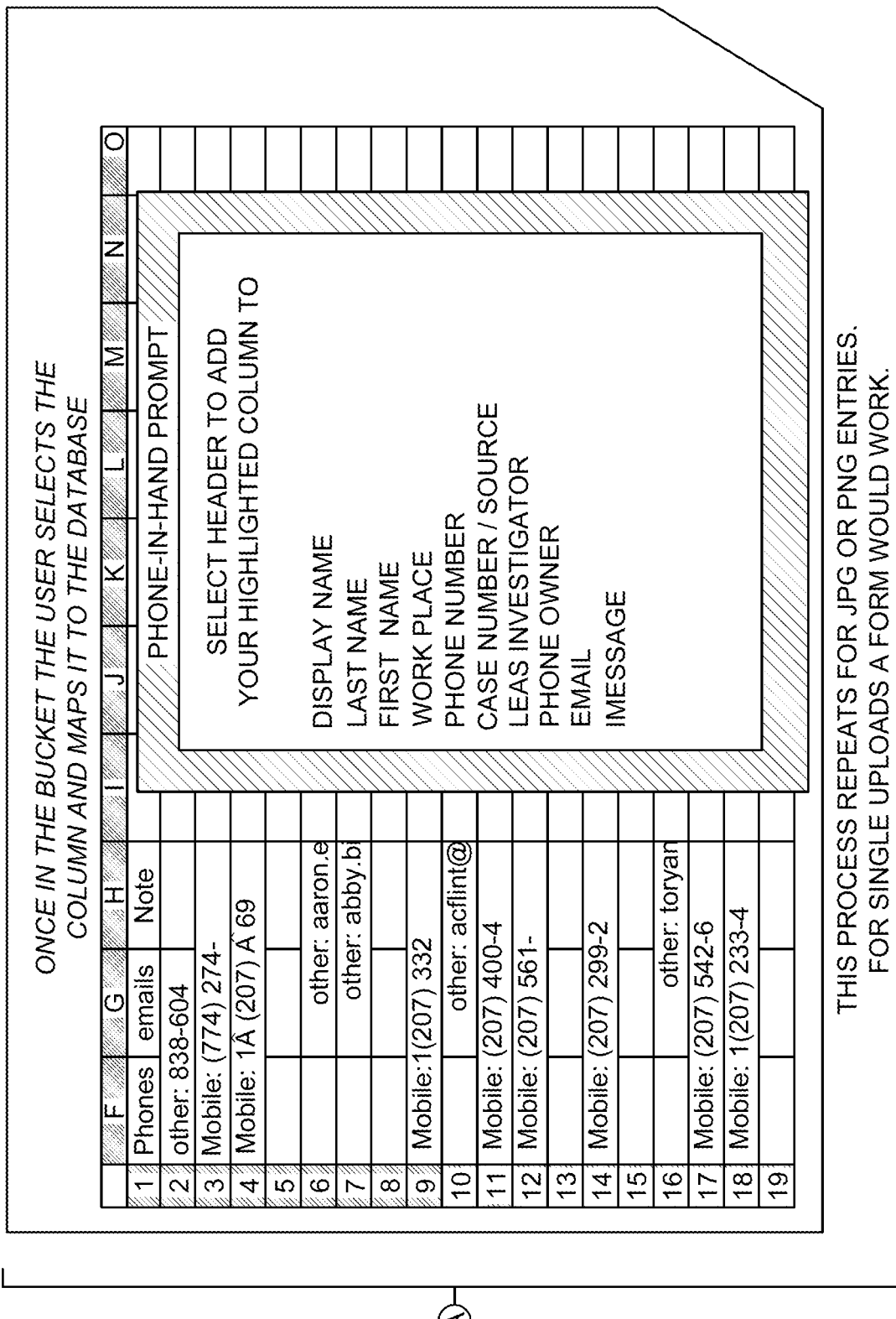
FIG. 8 comprises FIGS. 8A and 8B, which comprise a screen capture set of a second specific display showing the form and/or content of populated database or search results.
Figure 11:
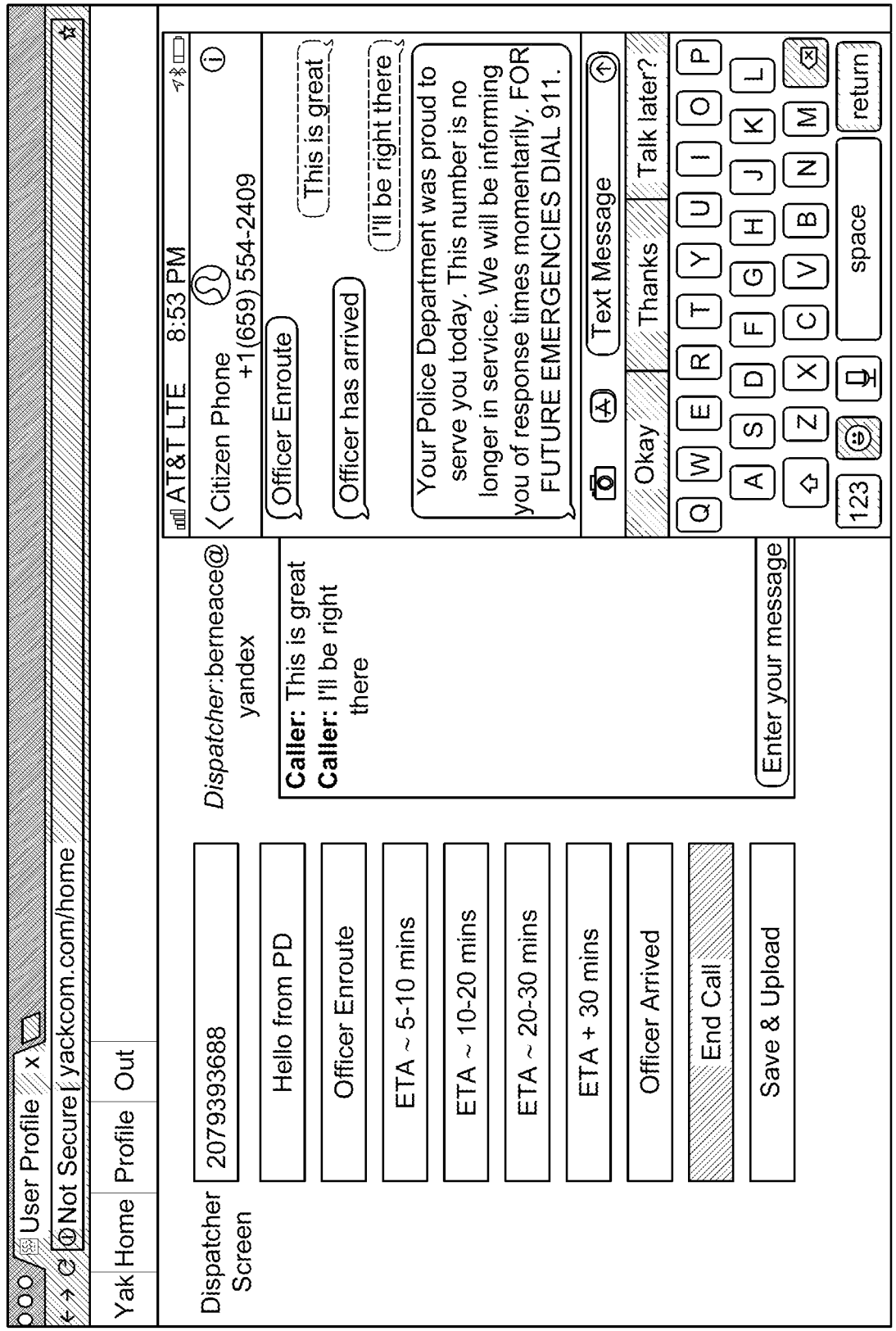
FIG. 11 is a screen capture of a user interface of the information dissemination system of the present invention.
Figure 12:
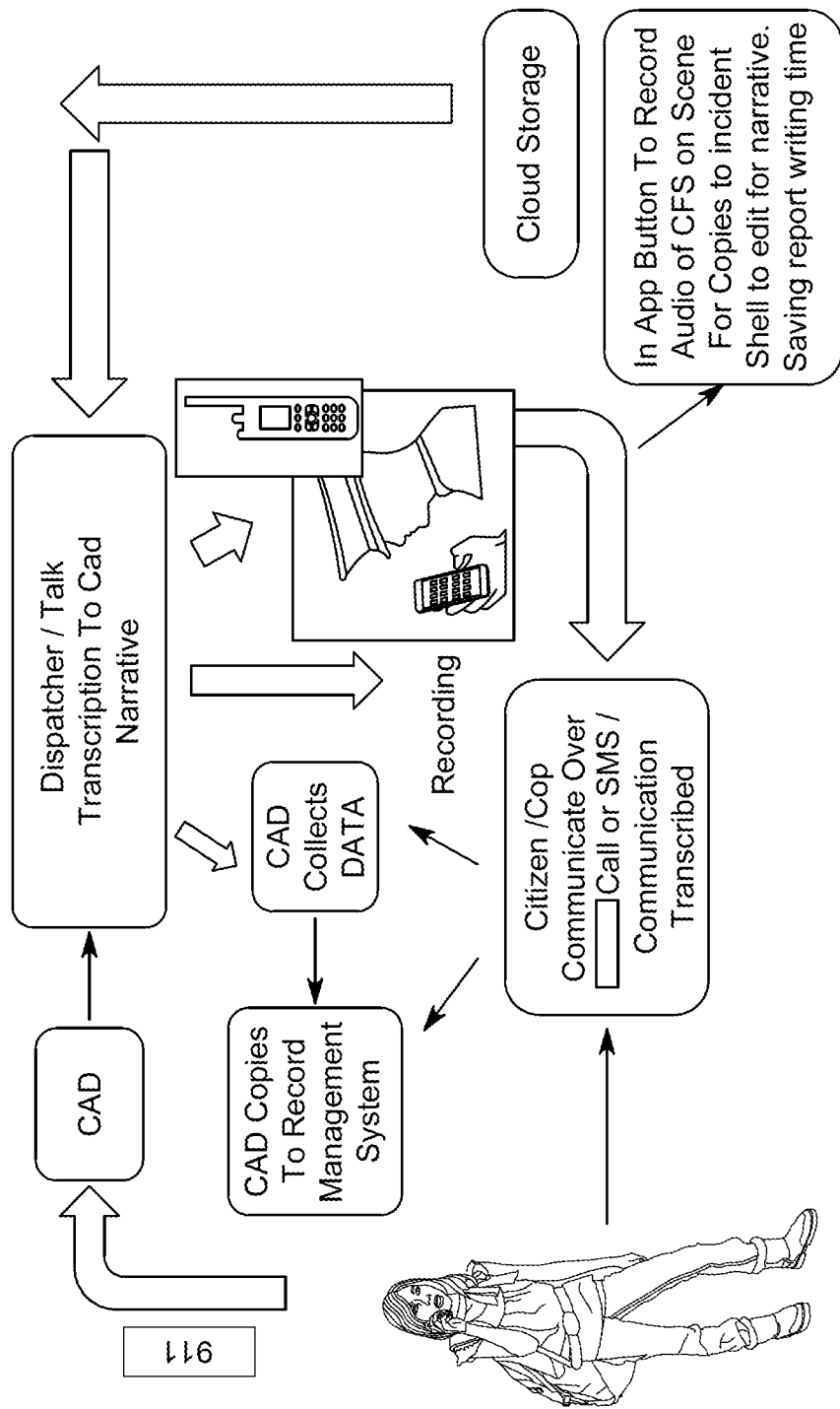
FIG. 12 is a diagrammatic representation of the flow of information and instruction of the system of the present invention to replace current radio dispatch systems with cellular phone devices by implementing cloud-based systems, chat-client, data, cellular channels, transcriptions, phone cameras, and CAD to copy to CRIMEs/RMS, all over preferred first responder networks, and remote wireless chargers, that can be stored to a cloud-based environment.
Figure 13:
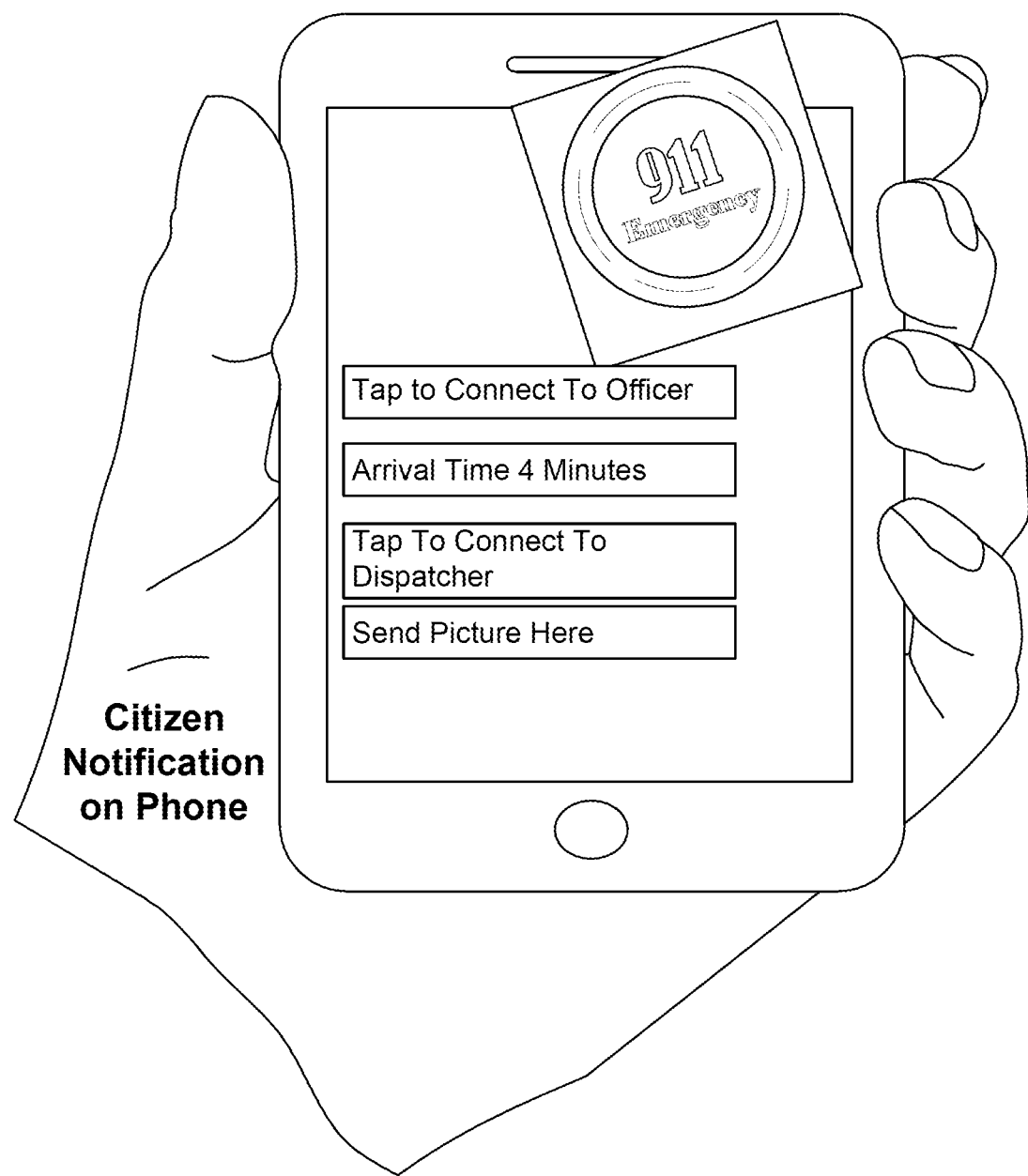
FIG. 13 is a representation of an example of what a user observes on a cellular device when accessing the citizen notification chat-client of the present invention.
Figure 14:
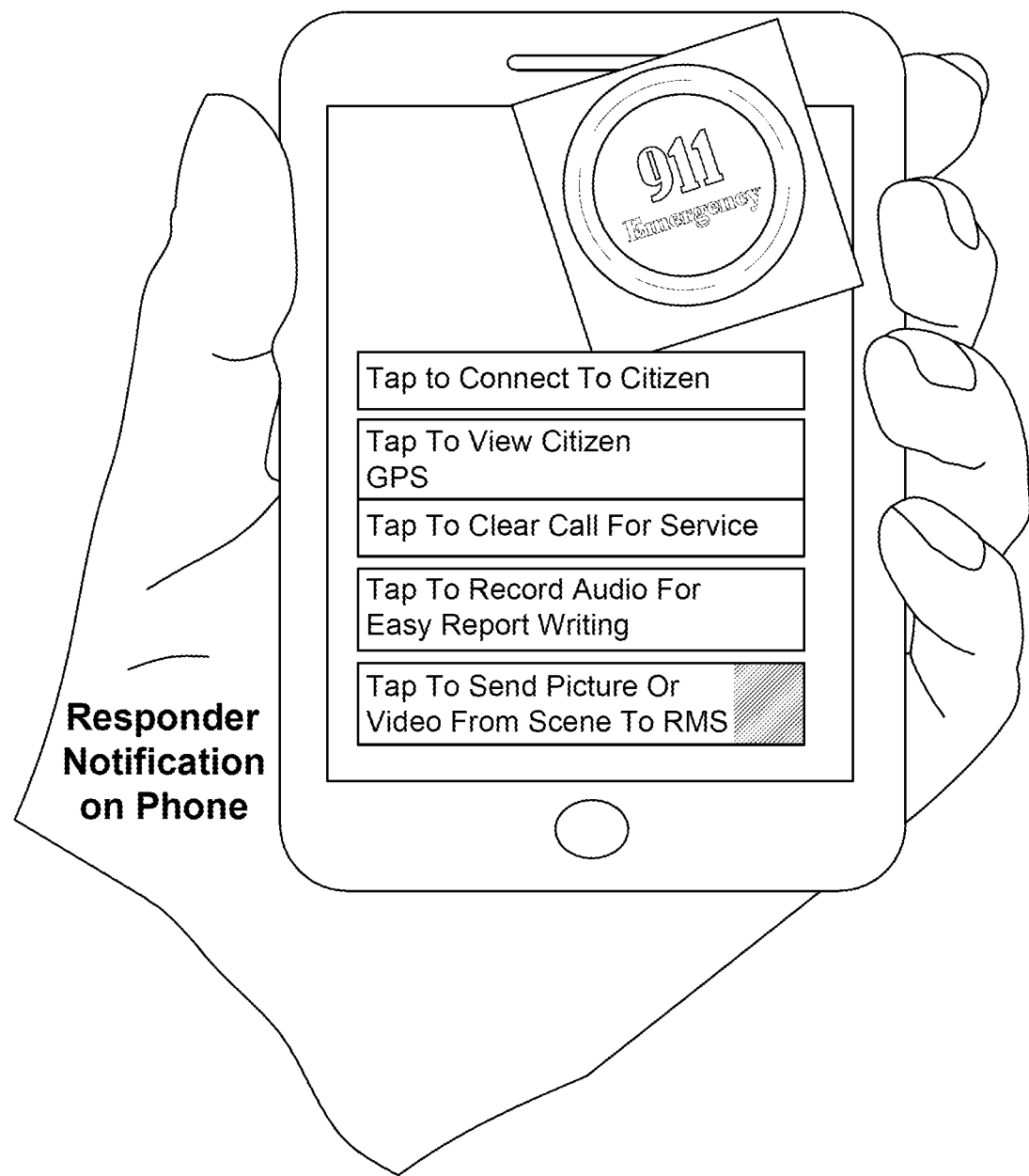
FIG. 14 is a representation of an example of what a first responder observes on a cellular device when accessing the notification chat-client of the present invention.
Figure 15:
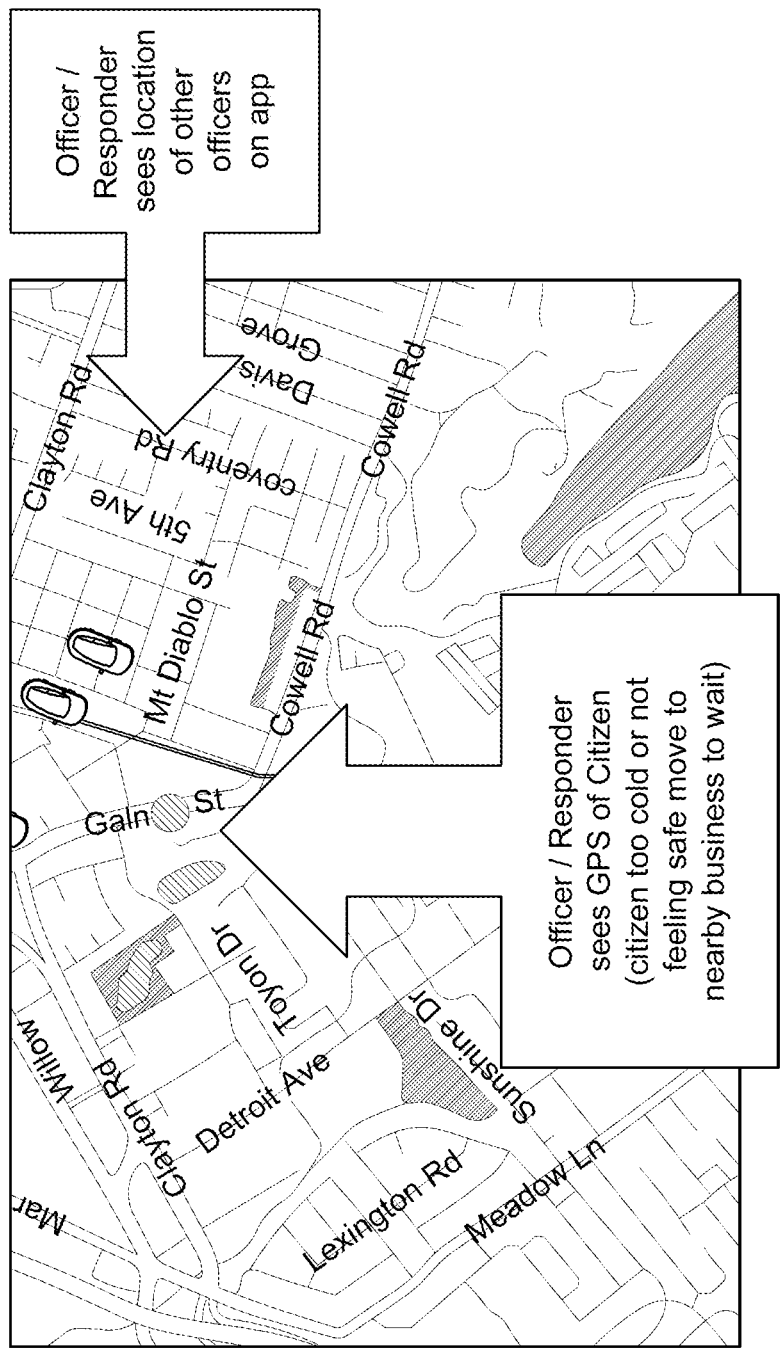
FIG. 15 is a representation of an example of what the first responder observes on a cellular device to identify locations of a citizen caller and other first responders.

The present invention is a first system and method configured to enable users to gather, store, access and share phone information, and a second system and method configured to enable users to engage in text-based communications about first responder activities. The systems of the present invention are sets of functions described herein embodied in a computing system programmed to perform functional steps associated with the methods be described and illustrated herein. The computing system may be associated with local or remote computing means, such as one or more central computers, such as server in a local area network, a metropolitan area network, a wide area network, or through intranet and internet connections.

The computer system may include one or more discrete computer processor devices. Examples of known computing devices that may be suitable for use with the invention include, but are not limited to, personal computers, server computers, hand-held or laptop devices, cellular phones including smart phones, multiprocessor systems, microprocessor-based systems, set top boxes, programmable consumer electronics, network PCs, minicomputers, mainframe computers, distributed computing environments that include any of the above systems or devices, and the like. The computer system may include computer devices operated by one or more users, such as through a desktop, laptop, or servers, and/or one or more providers of services corresponding to one or more functions of the invention.

The server, the computer processor, or a combination of both may be programmed to include one or more of the functions of the invention system. One or more relational databases that may be associated with the server, the computer processor, other computing devices, or any combination thereof, include information related to the use of the invention system. For example, the database includes information associated with a specific phone, its usage, and its user. The relational database of the present invention is used for gathering, storing, and making accessible cell phone and other information. For the purpose of the description of the present invention, a database is a collection of stored data that are logically related. Although there are different types of databases, and the database of the present invention may be any of such types, it is preferably a relational database with a relational database management system, comprising tables made up of rows and columns. Data stored in the relational tables are accessed or updated using database queries submitted to the database system. The database may be populated and updated with information provided by an application provider capable of carrying out one or more of the steps associated with the system of the invention, one or more businesses, or any other information providers.

The invention may be described in the general context of computer-executable instructions, such as program modules, being executed by a computer. Generally, program modules include routines, programs, objects, components, data structures, etc. that perform particular tasks or implement particular abstract data types. As indicated above, the system of the present invention may also be practiced in distributed computing environments where tasks are performed by remote processing devices that are linked through a communications network or other data transmission medium. In a distributed computing environment, program function modules and other data may be located in both local and remote computer storage media including memory storage devices. Storage of program instructions and database content may thereby be cloud-based as they can be stored on remote servers and accessed through internet-based connections.

The computer processor and interactive drives, memory storage devices, databases and peripherals may be interconnected through one or more computer system buses. The system buses may be any of several types of bus structures including a memory bus or memory controller, a peripheral bus, and a local bus using any of a variety of bus architectures. Computer system 100 typically includes a variety of computer readable media. Computer readable media can be any available media that can be accessed by the computer system and includes both volatile and non-volatile media, removable and non-removable media. By way of example, and not limitation, computer readable media may comprise computer storage media and communication media. Computer storage media includes volatile and non-volatile, removable, and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by the computer system. The computer system further includes computer storage media in the form of volatile and/or non-volatile memory such as Read Only Memory (ROM) and Random Access memory (RAM). RAM typically contains data and/or program modules that are accessible to and/or operated on by the computer processor. That is, RAM may include application programs, such as the functional modules of the system of the present invention, and information in the form of data. The computer system may also include other removable/non-removable, volatile/non-volatile computer storage and access media. For example, the computer system may include a hard disk drive to read from and/or write to non-removable, non-volatile magnetic media, a magnetic disk drive to read to and/or write from a removable, non-volatile magnetic disk, and an optical disk drive to read to and/or write from a removable, non-volatile optical disk, such as a CD-ROM or other optical media. Other removable/non-removable, volatile/non-volatile computer storage media that can be used in the computer system to perform the functional steps associated with the system and method of the present invention include, but are not limited to, magnetic tape cassettes, flash memory cards, digital versatile disks, digital video tape, solid state RAM, solid state ROM, and the like.

The drives and their associated computer storage media described above provide storage of computer readable instructions, data structures, program modules and other data for the computer processor. A user may enter commands and information into the computer processor through input devices such as a keyboard, a touchpad, or a pointing device such as a mouse. Other input devices may include a microphone, joystick, game pad, satellite dish, scanner, or the like. These and other input devices are connected to the computer processor through the system bus, or other bus structures, such as a parallel port, game port or a universal serial bus (USB) but is not limited thereto. A monitor or other type of display device is also connected to the computer processor through the system bus or other bus arrangement.

The computer processor may be configured and arranged to perform the described functions and steps embodied in computer instructions stored and accessed in any one or more of the manners described. The functions and steps, such as the functions and steps of the present invention described herein, individually or in combination, may be implemented as a computer program product tangibly as computer-readable signals on a computer-readable medium, such as any one or more of the computer-readable media described. Such computer program product may include computer-readable signals tangibly embodied on the computer-readable medium, where such signals define instructions, for example, as part of one or more programs that, as a result of being executed by the computer processor, instruct the computer processor to perform one or more processes or acts described herein, and/or various examples, variations and combinations thereof Such instructions may be written in any of a plurality of programming languages, for example, XML, Java, Visual Basic, C, or C++, and the like, or any of a variety of combinations thereof. The computer-readable medium on which such instructions are stored may reside on one or more of the components described above and may be distributed across one or more such components.

Access is granted to the phone information storage and access system upon completion of authentication procedures associated with the platform used to present a user interface for interaction by a user with the phone information database. FIGS. 1-10 depict the basic layout and types of information available for using the phone information storage and access system. The functions of the system and method for phone information gathering, storage and access are contained therein. Access to the phone information database of the present invention is made through authentication steps of the type generally known including, but not limited to, providing a user name and a password, for example.

With reference to FIGS. 11-16, the information dissemination system of the present invention is a tool for a dispatcher to send a citizen a text message through a web browser in the form of a User Interface (UI) to inform the citizen when an officer is in-route, the estimated time of arrival, and any additional information that the provider wishes to convey. The citizen may respond back to the dispatcher at any time, by simply responding to the text message on their phone, just like a traditional text message. All communications sent and delivered through the chat - - - client are logged and time/date stamped in the database, which may be an Amazon Web Based Government Services Cloud storage system (AWS) but not limited thereto. The exchange may be uploaded into a CAD system or any Records Management System due to the .txt file that is easily created and saved to memorialize the chat.

This chat client will allow a citizen to remain engaged with the same dispatcher who fielded the initial call for service via texting, while waiting for the officer to arrive. The citizen, for example, could inform the dispatcher that they have stepped inside a coffee shop to stay warm or perhaps inform a dispatcher the suspect fled the scene on foot and is heading "south on Main St." The chat - - - client time and date stamps the communication record between the dispatcher and the citizen and stores the messages to AWS, so the dispatcher may download the messages into Computer Aided Dispatch system (CAD) or a Criminal Incidents Records Management System (RMS), or simply to save it in a text file to email a supervisor.

The dispatcher may access the system through an authentication process of the type well know using any web browser (iPad, tablet, phone, or computer). At that time, the dispatcher may select from various templates, in the form of an icon such as exemplified in FIG. 10, to send the caller a text message informing the caller of what is happening now that the caller and the dispatcher have hung up the phone. The ease of the interface is extremely important as dispatchers may be engaged with more than one call at a time—a key efficiency that will help government entities save money on personnel costs over time.

In addition, using the present system, a caller can opt out of the service at any time (by responding to the text thread) and can also text important information to the dispatcher, such as a photo of a suspect leaving the scene, a license plate number, a description, or simply they've stepped inside of a local restaurant to stay warm or grab a cup of coffee while they wait for the officer to arrive. Routinely officers arrive on scene and do not know who called 911. Officers then have to radio back to dispatch and request the dispatcher to call the caller and to have the caller come meet the officer. Therefore, now a citizen can be easily informed and can be waiting for the officer at the call for service location. Citizens who are a part of what is referred to as a "priority call for service" will always stay on the phone with the dispatcher until the first responder arrives. The present invention does not replace the call-in and dispatch service. Instead, it augments that service to add customer service to non - - - priority calls for service such as a Motor Vehicle Burglary. This allows dispatch and first responders to focus time and attention on critical, life - - - or - - - death, calls while maintaining a high level of communication for more routine calls.

The information dissemination system is configured as a mobile-device accessible application that can be downloaded from an App Store by citizens so they may share their GPS location at any time with a dispatcher and also text through the app wherein the chat history can be saved. The app will be introduced to the citizen via the initial text from the dispatcher which would include a phrase stating, for example, "for an in-app experience please download this app from your app store (insert link to app)," but is not linked to an app. The dispatcher may also text a proprietary link that is embedded in the user interface, to a citizen caller, and upon receipt, the caller may tap the link and display his/her GPS location to the dispatcher's user interface screen. This helps to speed up finding the location of the citizen, whether the citizen is lost, disoriented, or orally conveying inaccurate location information.

The ability of a dispatcher to patch a first responder to the caller and have that call be transcribed and automatically emailed for easy upload into the agency's records' systems, using a system-designated phone number to protect the First Responder's real phone numbers.

The system further includes an alert system that can be sent to citizen app users, informing them of closed roadways, Amber Alerts, and any other important information. It also includes a text-a-tip functionality. In regard to the alert mechanism, if there is a match of content between one database ("silo") of information and information contained in another silo either in-house or across jurisdictions, the system is configured to report the existence of that information match. For example, if the user identifies a certain phone number as being of potential interest and enters that information into the system and that number shows up in an investigation silo or CAD silo or RMS silo, or in a Voice Over IP database, that user would be alerted by some form of communication such as an email or a text message, that that particular phone number has been used in another context. The alert function informs the user, such as through a pointer index, of the agency, date, time, owner of record, case number, and/or who had the "phone in hand".

The system may be configured so that only the dispatcher may see the GPS-identified location of the Officer, Fire Truck, or ambulance. This increases safety and facilitates effective estimated time of arrival. The system is further configured to include a record function. An officer arriving on a scene can tap a record button that will immediately begin recording and transmitting and transcribing an audio recording from the field to the Cloud at any time during the call for service. Picture and video information may also be captured and transmitted to storage with appropriate security settings for access control.

The chat client of the present invention may be integrated into existing communication mechanisms to replace standard radio communications between first responders and dispatch with a cellular device operating with applications, data channel, and voice channel. That can be done by integrating real time chat features, GPS tracking to dispatch officers to calls for service, call clearing, man-down button, deploying auto camera recording back to an internet-based cloud system (both remotely and by the officer in the field via certain clicks or voice commands) for recoding and real time monitoring and transcription. It can be integrated with hardware worn by officers to check their vitals to report back to dispatch, and report directly into dispatch in real time. All audio and data information originated via the phone can stored directly to both the phone and pushed into CAD and RMS on the cloud during service calls and during undercover investigations, wherein it can be useful to conceal the phone as if to appear to be off while nevertheless recording information. The communication mechanism may also include a language translation function arranged to enable either or both of the public safety agency and any of the plurality of citizens to translate a message from one language to another prior to transmission or after receipt. In this way, the communications remain as clear as possible, particularly when the communicating parties do not regularly communicate in a common language.

The system is also configured to enable a user (police, fire, EMS, or dispatcher) to conduct an exchange with a citizen wherein the user can initiate the exchange with his or her cell phone. However, the system is arranged to generate a virtual cell phone number that masks the user's actual cell phone number. The system is further configured to monitor the text exchange and record the content. Once the user has completed the call, the system is arranged to close out the exchange. Should the citizen seek to reactivate the exchange using what he or she believes to be a reliable number for the user, but which is actually a virtual number, the system is arranged to generate an automatic message to the citizen to direct contact to a different location, such as a call to 911 or a first responder official phone number, for example.

Figure 17:
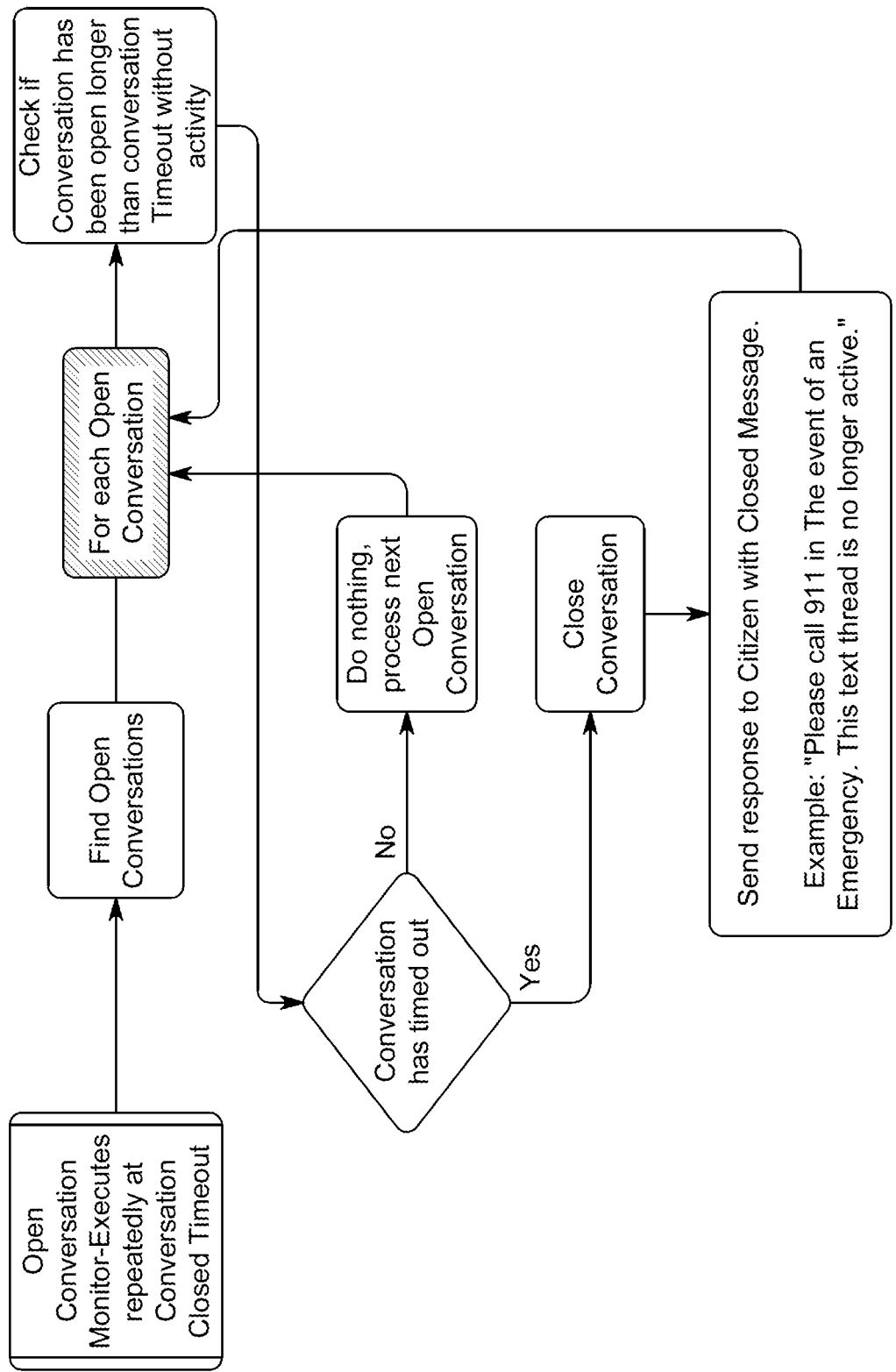
FIG. 17 is a flow diagram representing primary steps of the aspect of the system of the present invention for analyzing and directing a citizen text exchange.

With reference to FIGS. 17 and 18, the steps of the method associated with use of the system to minimize citizen access to the user include having the user initiate a text message exchange with a citizen. The citizen may respond to the user's message via the virtual phone number associated with the user-initiated exchange. If the conversation is "open" the user receives the text message by the citizen on the user dashboard. When the user is done communicating with the citizen, the user "closes" the conversation. The system then identifies that conversation as no longer active and closed. When the conversation is "closed" the system automatically sends the citizen a text message that says something such as "Please call 911 in the event of an emergency. This text thread is no longer active" or an equivalent type of notification.

The system will continuously check to make sure that the citizen does not respond back. If at any point in the future, the citizen for whom cell phone information was acquired when the user opened the exchange, texts the user and the conversation is still marked "closed" within the system database, then the system will automatically send the citizen a default message of something such as "Please call 911 in the event of an emergency. This text thread is no longer active" or an equivalent. This default message can be changed to fit the type of industry the user is in (applicable to industry larger than first responders). Only the user or relevant colleagues of the user can designate a text exchange thread open or closed.

If at any point in the future, a first responder (user) opens another text conversation with the citizen they both can begin communicating again. The process by which the system, realizes the text thread is "opened" is because the user has initiated a text message with the citizen first. By selecting "initiate text message" and entering the citizen's phone number or selecting the citizen from an internal phonebook will the exchange be opened. The citizen can respond but only during the time the user keeps the text conversation open. Once the user closes the conversation, an automated text is sent, and the thread is then closed. The system begins checking to make sure the citizen does not send another text and if the citizen does, the system will send the automated text message again. This arrangement gives the user control over citizen access to his or her cell phone contact information as well as the ability to limit any text exchange to that which the user wishes to engage in.

It is to be noted that while the focus of description is on law enforcement and other first responder users, the system can be adapted for use in the private sector in any industry that is setting appointments, for example, and/or choosing to send text messages to customers. This aspect of the system of the present invention lends a sense of professionalism by allowing a user to communicate with a citizen or a customer during business hours and redirect the citizen or client to the proper channels of communication after the initial text message conversation has been completed. For example, a businessman can text quick questions to professional contacts, have the texts stored for retrieval and not have to give out a personal or work cellular phone number and worry that the contact will text after hours. If the user is part of campus security or a school system, any text someone sends, including inappropriate ones, is stored and provides evidence of the transmitter's nefarious action. Keeping professional boundaries are important, directing citizens to proper channels is helpful, and this feature of the present system provides that.

Having thus described the two systems and methods of the present invention in an example-based format, it is to be understood that various alterations, modifications, and improvements are contemplated by the invention without deviating from its scope and spirit as defined by the following claims.

What is claimed is:

1. An information exchange system configured to improve the operation of a computing device to enable a public safety agency to exchange of information with a citizen on a mobile communication exchange device in a language understood by the citizen, the system comprising:

the computing device arranged for access to the internet and having stored thereon computer-executable instructions configured to cause the computer device to implement instructions controlled by a system user of the public safety agency;

a user interface function arranged to enable mobile device communication including text message communication between the citizen and the public safety agency;

a database of information accessible through the computing device, wherein the information of the database includes mobile device information, citizen information and event information;

a communication function arranged to conduct an exchange between the citizen and the public safety agency, including text message exchanges;

a language translation function arranged to enable both of the system user of the public safety agency and the citizen to translate a message of the exchange from one language to another prior to transmission or receipt when the system user and the citizen do not regularly communicate in a common language; and a mobile communication exchange upload function arranged to enable storage of content of the exchange on the database of information.

2. The system of claim 1 further comprising a user authentication function to enable a user to access the communication function and the database.

3. The system of claim 1 further comprising an opt-out function arranged to enable the citizen to terminate the exchange.

4. The system of claim 1 further comprising an access request function arranged to enable the public safety agency to reconstitute a communication with the citizen to notify the citizen of information relevant to the exchange.

5. The system of claim 1 wherein the user interface function is a web-based downloadable function.

\* \* \* \* \*